United States Patent [19]

Roth et al.

[11] 4,278,159

[45] Jul. 14, 1981

[54] TEMPERATURE CONTROLLED VISCOUS FAN DRIVE

[75] Inventors: Helmut Roth, Bloomfield Hills; Terry J. Farrell, Troy, both of Mich.

[73] Assignee: Chrysler Corporation, Highland Park, Mich.

[21] Appl. No.: 90,363

[22] Filed: Nov. 1, 1979

[51] Int. Cl.³ .................. F16D 35/00; F16D 43/25
[52] U.S. Cl. .................. 192/58 B; 192/58 C; 192/82 T
[58] Field of Search .......... 192/58 C, 58 B, 82 T, 192/106.1

[56] References Cited

U.S. PATENT DOCUMENTS

| Re. 25,481 | 11/1963 | Weir | 192/58 C X |
|---|---|---|---|
| 3,019,875 | 2/1962 | Fowler | 192/58 C |
| 3,101,825 | 8/1963 | Caroli et al. | 192/58 C X |
| 3,236,346 | 2/1966 | Roper | 192/58 C |
| 3,536,173 | 10/1970 | Merkert et al. | 192/58 C |
| 4,076,110 | 2/1978 | Tinholt | 192/82 T X |

FOREIGN PATENT DOCUMENTS 627021 9/1961 Canada .................. 192/82 T

Primary Examiner—Rodney H. Bonck
Attorney, Agent, or Firm—Newtson & Dundas

[57] ABSTRACT

A viscous drive mechanism, especially for an automotive cooling fan, is provided in which the input member is flexibly mounted to the input drive shaft in a manner permitting it to be moved axially under the influence of a thermostatic device to vary the working space gap between the impeller and the output drive member, thereby varying the output speed of the drive according to a given temperature variation.

2 Claims, 1 Drawing Figure

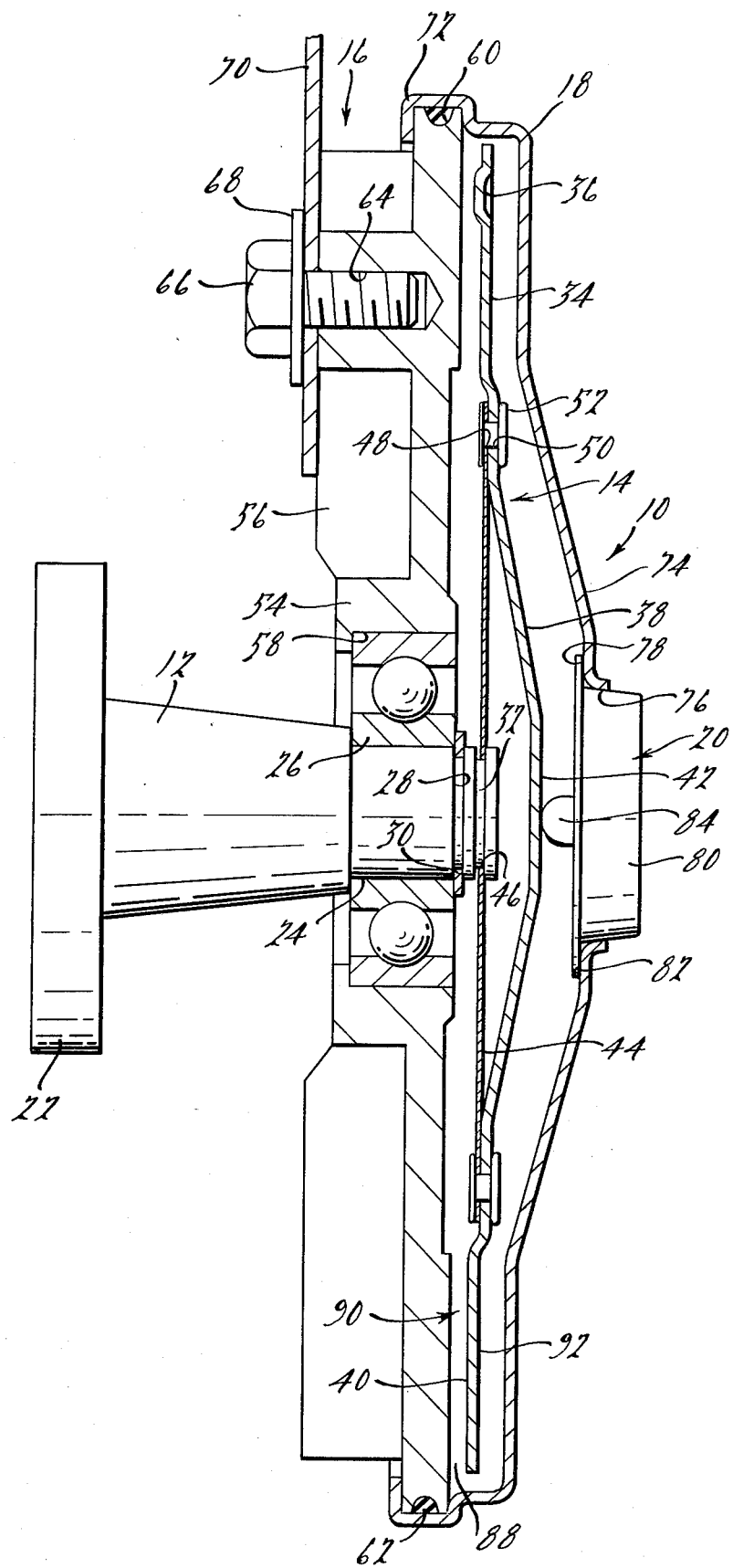

TEMPERATURE CONTROLLED VISCOUS FAN DRIVE

BACKGROUND OF THE INVENTION

1. Field of the Invention

The present invention relates generally to automotive cooling fan viscous couplings and more specifically to such couplings which are thermostatically controlled to effect variable speed operation.

2. Description of the Prior Art

Recognizing the desirability of reducing the power extraction of automotive cooling fans under conditions in which their maximum cooling effect is not required, those skilled in the art of viscous fluid couplings for the fans have made wide use of thermostatic controls. These controls have been employed to vary the quantity of fluid admitted to the working space between the input and output members of the coupling thereby varying the torque transmitted therebetween. Means have been employed to effect this quantity variation through directly changing the volume of the chamber enclosing the input and output members and through use of auxiliary chambers connected to the working space by valving. U.S. Pat. Nos. 3,019,875 and 4,076,110, respectively, are exemplary of these approaches.

Significant disadvantages have been found in the prior art devices however. Certain of them particularly those which vary working chamber volume have been extremely complicated and expensive to manufacture, requiring, inter alia, large diameter diaphragms or sliding seals, which also detract from the reliability of those devices.

Others, such as those employing a valved connection to an auxiliary chamber due to the normal variation in manufacturing tolerances, suffer from difficulty in achieving repeatability in performance, particularly in defining the minimum temperature at which driving of the fan will be effected.

SUMMARY OF THE INVENTION

Responsive to the deficiencies in the prior art devices, the present invention provides a simple economical viscous coupling for an automotive cooling fan in which the variation of the speed differential between its input and output members is controlled in response to differences in temperature by varying the width of the gap or working space between the input and output members. According to a feature of the present invention this is accomplished by axially resiliently mounting the input member of the coupling to the input shaft and moving the input member axially with respect to the output member in response to variations in temperature sensed by a thermostatic actuator member carried in the housing surrounding the input and output members.

BRIEF DESCRIPTION OF THE DRAWING

This and other features and advantages will become apparent to those skilled in the art upon reading the following detailed description with reference to the accompanying drawing in which FIG. 1 is a cross-sectional view of the temperature controlled viscous fan drive of the present invention.

DESCRIPTION OF THE PREFERRED EMBODIMENT

Turning now to the drawing, the viscous fan drive of the present invention is indicated generally at 10. It is illustrated as comprising a drive shaft 12, an impeller assembly 14, an output assembly 16, and a cover 18 and a thermal actuator 20.

The input drive shaft 12 includes a drive flange 22 whereby it may be drivingly connected to a portion of an automotive engine. It is cantileverly mounted to an output drive such as the water pump shaft of the engine in a conventional manner (not shown) and includes a bearing surface 24 on which a conventional antifriction bearing 26 is mounted. A retainer groove 28 is formed in the input drive shaft 28 for receiving a conventional retainer 30, such as a snap ring, for axially retaining the bearing 26 with respect to the input drive shaft 12. A drive groove or surface 32 is also formed on the input drive shaft positioned axially proximate the retainer groove 28, the drive groove 32 defines a suitable noncircular section such as a square for drivingly engaging the impeller assembly 14.

The impeller assembly 14 includes an impeller disc 34 on which are formed sacrificial wear pads 36 for a purpose to be described later. The impeller disc 34 further includes a central conical projection 38 extending outwardly with respect to the input drive shaft 12. Two relatively flat surfaces are formed on the impeller disc 34. First, an annular drive face 40 is formed in juxtaposition to the output assembly 16. Second, a flat actuating face 42 is formed at the central terminus of the conical projection 38. The impeller assembly 14 further includes a resilient mounting disc 44 formed preferably of relatively thin sheet metal. The disc 44 includes an inner drive surface 46 cooperating with the drive groove 32 of input drive shaft 12. The disc 46 may be split to facilitate assembly onto the drive groove 32 or other conventional assembly methods may be employed. Adjacent the other periphery of the mounting disc 44 are formed a plurality of apertures 48 which register with a corresponding plurality of apertures 50 formed through the impeller disc 34. Shouldered fasteners such as rivets 52 fixedly secure the mounting disc 44 to the impeller disk 34 in cooperation with these apertures.

The output drive assembly 16 includes an output member 54 preferably formed as a die casting. The output member includes cooling fins 56 of the type well known in the art. Centrally formed in the output member 54 is a bearing pocket 58 shouldered to retain the anti-friction bearing 26. An outer seal groove 60 is formed on the outer periphery of the output member 54 for receiving a static seal 62, such as an O-ring. A plurality of threaded bores 64 are formed on the outer surface of the output member 54 for receiving screws 66 which in cooperation with washers 68 secure fan partially shown at 70 in a well known manner to the output housing.

The cover 18 may be formed as a stamping and includes a cover seal flange 72 which is formed over the outer seal groove 60 at the periphery of output member 54 to effect static sealing. The cover 18 further includes a conical projection 74 substantially parallel to the conical projection 38 of the impeller disc 34. A central bore 76 is formed at the termination of the conical projection 74 and defines an inner shoulder 78 for receiving the thermal actuator 20.

The thermal actuator 20 may be of a well known type of the sort including what is referred to as a wax pill. It includes an actuator body 80 and a mounting flange 82 for abuttingly engaging the inner shoulder 78 of the cover 18. The thermal actuator additionally includes an actuating piston 84 which is moved by thermal expansion of the so-called wax pill.

OPERATION OF THE PREFERRED EMBODIMENT

The viscous fan drive 10 of the present invention operates to drive the cooling fan for an automotive engine in the following manner. First, a quantity of a known viscous fluid is introduced into the cavity 90 defined by the cover 18 and the output member 16. When the ambient temperature is below 100° F., the parts of the visous fan drive 10 assume the position shown on the drawing figure and the wide gap 88 exists between the drive face 40 of the impeller assembly 14 and the driven face 92 of the output assembly 16. Thus, upon starting the vehicle engine turning the input drive shaft drives the impeller assembly 14, but when the gap 88 exceeds approximately four-thousandths of an inch in a device having an outer diameter of approximately 12 inches, very little torque will be transmitted between the impeller assembly 14 and the output assembly 16. Thus, the fan 70 will turn very slowly. Upon increasing ambient temperature however, the actuating piston 84 of the thermal actuator 20 extends in a leftward direction as shown in the drawing figure, engaging the actuating surface 42 of the impeller disc 34 and tending to move the impeller disc 34 leftward. Since the mounting disc 44 is a flexible member, this movement is permitted and the gap 88 reduces toward a minimum value of about five thousandths of an inch at 150° F. It is well known that reducing this gap tends to increase the torque transmitted between the input and output members in a predictable fashion. Thus, as progressively more torque is transmitted between the input and output members, the fan 70 is driven at an increasing speed. It has been found that this means of varying the speed of the fan 70 is both readily controllable as described and accurately repeatable, enhancing the reliability and economical producibility of the device.

While only one preferred embodiment in the present invention has been described, it will be clear to those skilled in the art that modifications may be made without departing from the scope of the appended claims.

What is claimed is:

1. A variable speed viscous drive mechanism comprising:
    A. An input drive shaft;
    B. impeller means drivingly engaged by said drive shaft and including a generally disc-shaped member having a central generally conical concave projection extending away from an output member;
    C. said output member rotatively supported on said drive shaft in axially spaced relationship with said impeller means for relative rotation with respect to said impeller means;
    D. a housing member carried for rotation with said output member and surrounding said impeller means;
    E. a predetermined quantity of working fluid carried within said housing member through which said output member is driven by said impeller means; and
    F. mounting means for said impeller means operative to permit movement of said impeller means axially between a first position remote from said output member and a second position proximate said output member to effect variations in the difference of rotational speeds between said impeller means and said output member, said mounting means comprising a readily flexible disc-like member fixedly secured to said disc-shaped member adjacent the outer periphery of said projection and drivingly engaged with said drive shaft.

2. A variable speed viscous drive mechanism as defined in claim 1 and further comprising a temperature responsive motor carried in said housing member and exposed to ambient temperature and having a piston portion engaging said projection whereby variations in ambient temperature between first and second predetermined values effects said movement of said impeller means between said first and second positions.

* * * * *